T861021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 368

758,698

PHOTOCATALYTOGRAPHIC PROCESS OF PRODUCING IMAGE STRUCTURES AND IMAGE RELIEFS

Jorg Jaskowsky, Ruit, Wurttemberg, Germany

Filed Sept. 10, 1968. Published Apr. 8, 1969

Claims priority, application Germany, Apr. 4, 1968, P 1,772

Class 96—48

No Drawing. 5 Pages Specification

A photocatalytographic process for producing images is described which comprises exposure to electromagnetic or corpuscular radiation of a chemical material or material system to produce a substance (the latent image) which has an inductive and/or catalytic effect on a second metastable chemical system (the developer) whose inductively or catalytically produced reaction products intensify the latent image. In an example, arsenic hydride is imagewise exposed to actinic radiation to form a latent image of elemental arsenic which is developed with a solution of sodium dibromoauriate. The resulting gold image is further intensified with a copper physical developer to give an electrically conducting image.